United States Patent [19]
Noro et al.

[11] Patent Number: 5,997,603
[45] Date of Patent: Dec. 7, 1999

[54] SINTERED METAL MOULD AND METHOD FOR PRODUCING THE SAME

[75] Inventors: Yoshihisa Noro, Kanagawa-ken; Junichi Adachi, Tokyo, both of Japan

[73] Assignees: Shimizu Shokuhin Kaisha, Ltd., Shizuoka-ken; Apex Co., Ltd., Tokyo, both of Japan

[21] Appl. No.: 08/864,425

[22] Filed: May 28, 1997

[30] Foreign Application Priority Data

Jun. 4, 1996 [JP] Japan .................................. 8-141386

[51] Int. Cl.⁶ .......................... B22F 3/12; B27C 43/18
[52] U.S. Cl. ............................. 75/22.8; 419/36; 419/38; 264/669; 264/621; 501/94
[58] Field of Search ................ 419/36, 38; 264/63, 264/669, 621; 75/228; 501/94

[56] References Cited

U.S. PATENT DOCUMENTS

| | | |
|---|---|---|
| 4,341,725 | 7/1982 | Weaver et al. ......................... 264/28 |
| 4,734,237 | 3/1988 | Fanelli et al. ......................... 264/122 |
| 5,047,181 | 9/1991 | Occhionero et al. ..................... 264/28 |
| 5,047,182 | 9/1991 | Sundback et al. ....................... 264/28 |
| 5,063,183 | 11/1991 | Taniguchi et al. ...................... 501/96 |
| 5,087,595 | 2/1992 | Marsh et al. ........................... 501/105 |
| 5,242,872 | 9/1993 | Taniguchi et al. ...................... 501/98 |
| 5,250,251 | 10/1993 | Fanelli et al. ........................ 264/328.2 |
| 5,258,155 | 11/1993 | Sekido et al. .......................... 264/109 |
| 5,279,994 | 1/1994 | Kerkar .................................. 501/94 |
| 5,286,767 | 2/1994 | Rohrbach et al. ....................... 524/27 |
| 5,427,734 | 6/1995 | Yamashita et al. ...................... 419/23 |
| 5,770,136 | 6/1998 | Huang et al. .......................... 264/101 |

*Primary Examiner*—Daniel J. Jenkins
*Attorney, Agent, or Firm*—Wenderoth, Lind & Ponack, L.L.P.

[57] ABSTRACT

A sintered metal mould formed by plastically forming a material consisting of a metal powder or ceramic powder being mixed with a binder consisting of agar powder, and sintering the material.

16 Claims, 1 Drawing Sheet

SINTERED METAL MOULD AND METHOD FOR PRODUCING THE SAME

BACKGROUND OF THE INVENTION

The present invention relates to a metal mould for use in a moulding process, and particularly to a porous metal mould obtained by sintering metal powder, and a method for producing such a metal mould. Further, this invention relates to a sintered metal mould or a sintered porous metal mould for use in a moulding process and which is moulded from metal powder by a pressure forming method, and to a method for producing the same.

Heretofore, in producing a production type metal mould for use in a vacuum forming process, pressure forming process, blow forming process, injection forming process and the like, a mould for trial production is first formed and, thereafter, moulds for mass production are formed based on the trial production mould. The following two procedures are used in forming the mould for trial manufacture.

The first method is as follows: the manufacturer of the metal mould makes a master model having the shape of the final product, said master model being based on the drawings supplied from the client and made from timber, plaster, synthetic resin or easily machineable metal and the like. Next, by utilizing a pouring type epoxy resin containing metal powder, a mould for trial production having a reversed form to the master model is formed.

According to the second method, the manufacturer of the metal mould, based on the drawings supplied from the client, makes directly the mould for trial manufacture, by machining a material such as easily machineable aluminum or bronze.

The first method is, compared with the second method, advantageous in that the method is simple and that the time for producing the mould for trial manufacture is short. However, the mould of the first method is inferior to the mould of the second method in respect of pressure resistivity, thermal resistivity, abrasion resistivity and thermal conductivity. Thus, the first method cannot be applied to the mould of a material such as polycarbonate resin or a compound material including glass fiber in which the injection should be performed at high pressure and high temperature. Further, the heat conductivity of the mould itself is very poor, thus, a long time is required to cool the mould sufficiently. As a result, the characteristics of the article formed by utilizing the mould of the first method is inferior to the article formed by utilizing the mould of the second method which utilizes a metallic material having excellent thermal conductivity.

Accordingly, the maker of the mould first utilizes the epoxy resin and the like in making the mould of the trial production and produces a trial product utilizing a material which permits injection moulding at a lower pressure and temperature than that of the final product, which material is different from that of the final product namely a compound material of polycarbonate resin. The maker then sends the trial product to the purchaser to confirm the configuration and the function of the trial product and, if required, corrects the mould of the trial production and re-confirms. Thereafter, the drawings for the final mould are determined.

When the drawings of the final mould are determined, a mould for use in production is prepared. Usually, such a mould is formed of a well known metal for use in a metallic mould by processing means such as an electric discharge machining technique and the like.

PROBLEMS TO BE SOLVED BY THE INVENTION

In such a machining operation, the amount of material being removed increases when the size of the mould increases, thus, the time for the machining increases. Further, since the cost for the mould considerably affects the cost of the final product, and purchasers therefore wish to reduce costs by utilizing the same mould for trial production as that for the mass production.

The mould for the trial production being formed of epoxy resin and the like can be utilized to produce only a very limited number of products. Thus, it is required to make a metallic mould for production even though there are few products.

The mould for the trial production which is formed by machining an easily machineable metal such as aluminum, bronze or the like is advantageous in terms of cost and machinability even though the same amount of metal is removed during the machining operation as that in the mould for the production. However, the metal utilized in the former is cheap and easily machineable and the time for machining can be reduced as compared with steel usually utilized as a material of the mould for the production. However, the former is inferior in corrosion resistance and pressure resistivity.

The product formed by utilizing the metal mould for the trial production (according to the second method) has almost the same configuration and function as the desired product as compared with the product formed by utilizing the resin mould. However, the life of the mould is limited when the resin or the compound material is required to have corrosion resistive properties or pressure resistive properties. Therefore, the metal mould for trial production cannot be utilized as a mould for mass production.

As described above, the resin mould for trial production can only be utilized to confirm the configuration and the function of the product although the time for making the mould can be reduced, and the metal mould for the trial production is cheaper than that for production but is more expensive than a resin mould and cannot be utilized as a mould for production even if only a few products are produced.

Further, in forming the mould for the production, it is required to remove a large amount of metal from a block. Recently, machining techniques have made considerable progress and the time for making metal moulds has been reduced. However, when the mould is large, the amount of the metal being cut off increases with the result that the cost for making moulds has not been significantly reduced. Further, in recent years, the kind of production has tended to change from mass production of small goods to smaller scale production of large goods. Further, with technical development progressing very quickly the life cycle of goods has tended to become short. Thus, the production of the new mould is performed frequently, and the life of the mould tends to become short. Accordingly, the cost for making the mould increases.

For preventing further cost increase in the making of metal moulds, there have been proposed various means, namely an optical moulding system, the utilization of composite of metal and resin on the material being filled into the mould of the trial production, the rationalization in the system covering the design through the production by utilizing the CAD/CAM system and numerically controlled machine and the like; however, such countermeasures cannot fully solve the problems. Further, the moulded metal moulds have various shortcomings, namely defective dimensional accuracy, insufficient stability of the mould with respect to the mechanical strength, high levels of investment in plants and equipment and the like. Further, since the mould thus formed is the mould for trial production and it is required to first form an inverted model from a metal block thereby, it is not possible to reduce the cost of the metallic mould.

Further, mouldings utilized in precision equipment such as information processing devices are required to be of high quality. Thus, the metal mould should also be of high quality. Usually, such a high accuracy mould is formed from a super hard material such as a tungsten carbide-cobalt alloy by utilizing an electric discharge machine and the like. However, cutting such a material is very difficult and cutting efficiency is low. Further, cracks are frequently observed in the material during electric discharge processing. There exists also the problem that the life of the metallic mould is relatively short.

The metallic mould of the tungsten carbide-cobalt alloy is formed by sintering the mixture of tungsten carbide powder and cobalt powder by utilizing powder metallurgy. It is also proposed to form a mould directly having the inverted configuration of the master model by utilizing powder metallurgy, which is advantageous in that it saves on the cutting process of the super hard material. However, since powder metallurgy is essentially a press forming technique, the shape of a mould is simplified, and the process can only be applied to a simple configuration. A mould having a complicated configuration cannot be formed. Further, since it is required to form a mould for the press forming process, the process becomes further complicated. The powder metallurgy process is not limited to the tungsten carbide and cobalt alloy, but the problems above described are also observed.

Further, in the powder metallurgy process, it is not possible to form a large sized sintered mould due to the binder removing step being performed after the forming step. The binder removing step is performed between the forming step and the sintering step and, in which, the moulding being newly formed is received in a degreasing furnace, the wax is removed at 90–120° C. and, the plastic is thermally decomposed at 400–500° C. At that time, gas is generated by the thermal decomposition of the plastic and the gas volatilizes from the metal mould. When heating is rapidly effected the plastics expand thermally which may cause cracks in the moulding. Further, the temperature of the thermal decomposition of the plastic is near to the temperature of the carbonization reaction between the carbon atom of the plastic and the metal atom. Thus, the amount of residual carbon in the sintered product tends to increase, and the mechanical strength of the product is effected thereby.

Further, in the metal moulds for use in vacuum moulding, air pressure moulding or blow moulding, there are provided in the mould exhaust holes (vacuum holes) of minute diameter. However, the number, the configuration and the position of the exhaust holes can only be determined by use of a highly skilled technique and long experience. Further, in injection moulding, it is also required to provide mechanisms such as air vent openings or gas vent holes. However, such mechanisms also require a highly skilled technique and long experience.

DISCLOSURE OF THE INVENTION

The present invention aims to dissolve the above described shortcomings in prior arts and according to the invention, the pouring type compound material of metal and resin utilized in transcribing the master model is substituted by a compound formed from agar binder utilized to be transcribed into an inverted model, and a novel jig is prepared for heating and forming to form a sintered metal mould by sintering the inverted model. By utilizing the compound formed by agar binder as the transcribing material, it is possible to hot form the inverted model at a relatively low pressure. Thus, the master model is not damaged and a master model having a complicated shape can be faithfully deplicated because of fluidity. Since the binder removing step can be omitted and the formed moulding can be directly placed in a furnace and sintered, the sintered mould can be formed in a short time, and the characteristics thereof as a metal are nearly equal to that of the steel utilized as a metal mould. According to the present invention, it is possible to substantially omit the cutting operation applied on a metal block, and only a finishing process is required. A metallic mould for trial production which is of substantially the same quality as that of a steel mould for production can be formed in a very short time.

According to the present invention, it is required to prepare new jigs and new sintering steps, but it is possible to completely solve the above described problems in prior art mould utilizing pouring type compound material of metal and resin, or the mould of easily machineable metallic material.

The sintered mould for trial production thus formed according to the present invention can be utilized as the mould for production by applying slight correction.

To solve the problems relating to the binder removing step, according to the invention, metal powder is formed under compression with the binder of agar powder. The compression forming utilizing the agar powder as the binder, as disclosed by the inventor of this application in Japanese Patent Publication 7-68566 (U.S. Pat. No. 5,258,155 patented on Nov. 2, 1993) and Japanese Patent Application 6-166847 with respect to the injection moulding of metal or ceramic powder, makes it possible to omit the binder removing step, thereby enabling easily the sintered product having large product of a complicated configuration. Particularly, the powder of the tungsten carbide consists of a very small particle powder in the order of submicrons to obtain high strength. Thus, the percentage of the binder being included increases which causes a long time for the binder removing step or the fat or oil removing step. However, according to the present invention, it is possible to omit the binder removing step by utilizing agar powder as the binder in a very small particle powder in the order of submicrons. The agar powder mainly consists of natural polysaccharides such as agarose and, as clearly shown in the constitutional formula, has a ring construction having an —OH group, —H group, —CH$_3$ group and —COOH group on carbon atom, and —O— connection forms a polymer condition. Thus, by heating at low temperature (140–280° C.) the condensation reaction is easily effected as is the thermal decomposition. Therefore, by utilizing this function, in the course of the temperature elevating step during sintering, water for dissolving the agar powder evaporates first, and thereafter agarose is decomposed thermally to vaporize gaseous H—O—H, O—C—O and C—O. Particularly, when the powder agar is dissolved in water at a temperature of 90–110° C., the hydrogen ion connection causes between the water molecule (H—O—H) and the (—OH) group of the agarose, and the reversible reaction of sol/gel is caused by the thermal reaction. Namely, the sol-condition having fluidity is obtained by heating, and the gel-condition of a solid state is obtained by cooling. The present invention is made by utilizing this function in a material for making an inverted model from a master model. Thereby problems in making a metal mould utilizing a binder of a plastic wax type in the prior art can be fully be overcome. Further objects and advantages of the present invention will become apparent from the following detailed description relating to preferred embodiments of the invention in conjunction with the attached drawings showing some preferred embodiments of the invention.

BEST MODE FOR EXECUTING THE INVENTION

Some preferred examples of the present invention will now be explained. However, it will be noted that the invention is not limited to these examples. Example 1 relates to a case wherein the powder of SKD-11 metal, being typical as a metal mould material, is utilized to form the metal mould, and shows the method for making a mould for trial production, which has a usual configuration and does not require any special air vent (exhaust holes). Example 2 relates to the case wherein the metal powder of tungsten carbide (WC) of super hard metal is utilized to form the metal mould which has a usual configuration and does not require any special air vent (exhaust holes). Further, Example 3 relates to the case wherein the metal powder of tungsten carbide (WC) of super hard metal is utilized to form the metal mould and has a configuration which requires an air vent (exhaust holes). When the product which has been moulded utilizing the trial production mould and has been moulded as in the above Examples is satisfactory, the mould can be utilized for the actual production. Further, since the moulds formed according to these Examples have configurations which faithfully duplicate the master model, it is not required to substantially perform adjust cutting or the amount of required cutting is reduced. Further, by utilizing the compression forming of the metal powder with the binder of agar powder, it is possible to form a large metal mould utilizing the alloy of tungsten carbide (WC) and cobalt.

EXAMPLE 1

Metal powder of SKD-11, being typical as the steel for the metal mould, is utilized to form a metal mould.

(1) Firstly, a powder compound having the following composition (weight %) is prepared.

SKD-11 (mean grain size 10–15$\mu$) 86.09% agar powder (gel strength 2000 g/cm$^2$) 3.48% stearic acid 0.41% water 10.02%

The agar powder, the water, and half the required amount of the metal powder are put into a kneader heated at a temperature of about between 94–110° C. and shaken so as to dissolve completely the powder agar and to form a sol with the metal powder being mixed. Next, the temperature of the sol is cooled to about 60° C. and the remaining metal powder and stearic acid are added. A compressing cap of the kneader is covered so as to sufficiently press and knead the mix. Thereafter, it cools to 30–35° C. to form a metal block. Thereafter, the metal block is crushed by means of a crushing machine or the like to form a compound in a powder state.

Figure 1:
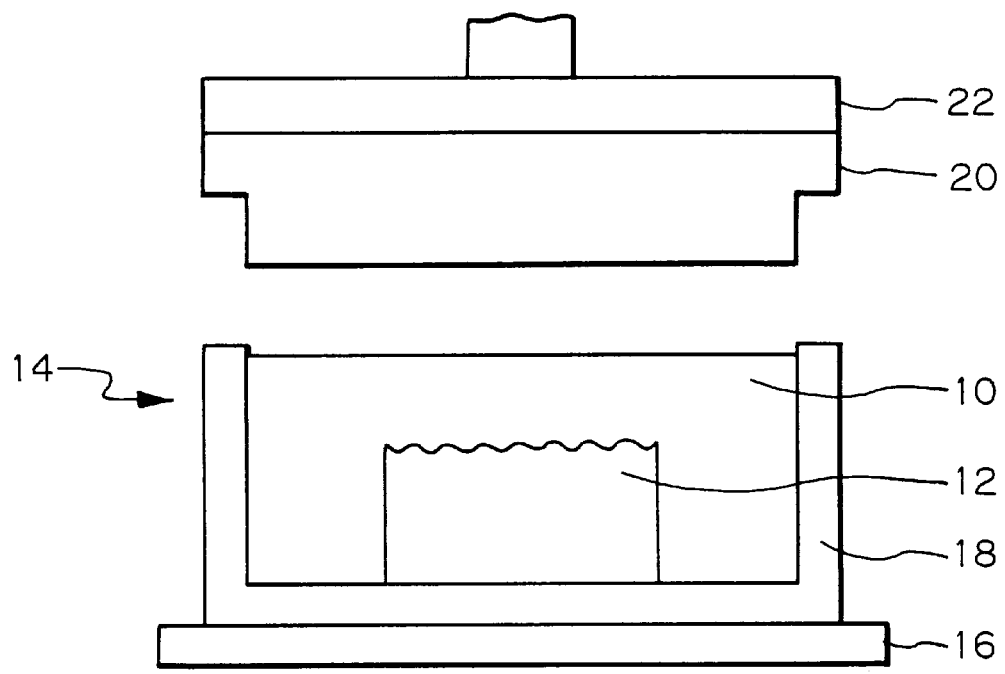
FIG. 1 is a schematic view showing a pressure device for compressing a compound according to the invention.
Figure 2:
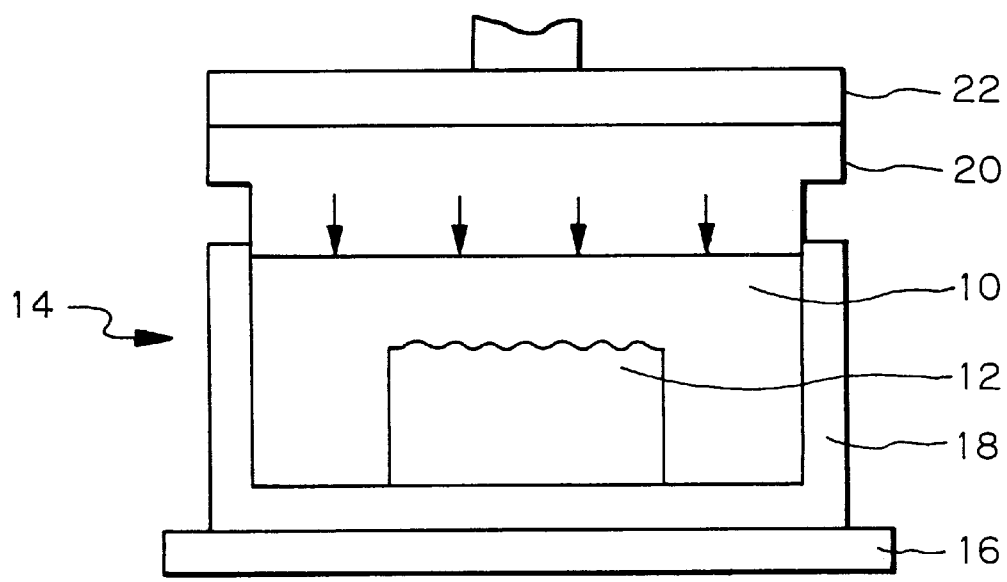
FIG. 2 is a schematic view showing the pressure device of FIG. 1 in compressing the compound.

(2) Next, a master model 12 prepared beforehand is, as shown in FIG. 1, put in a moulding box 18 which is located on a temperature adjustable fixed plate 16 of a metallic mould forming apparatus 14 and, the compound 10 formed according to the step (1) is filled on the master model 12 located in the moulding box 18; further, an upper cap 20 also constituting the metallic mould forming apparatus 14 is located on the compound 10, and the upper cap 20 is, as shown in FIG. 2, compressed by a temperature adjustable pressure plate 22 at a pressure of about 50 kg/cm$^2$. Incidentally, the master model 12, based on the drawings supplied by the client and in consideration of the coefficient of shrinkage during the sintering and the coefficient of shrinkage during the mould forming, is formed correctly by utilizing hand tools or processing machines, or by the CAD/CAM system. Preferably, the master model is moulded of a material such as a plastic which does not easily deform or absorb water at a temperature of about 100° C. Preferably, the volume of the master model is measured, then the amount of the compound required can be easily calculated. Further, the fixed plates 16 and 22 of the metallic mould forming apparatus 14 are provided with electric heaters, piping of heating fluid and the like so as to adjust freely the temperature of the fixed plates 16 and 22.

(3) Maintaining the pressing condition, or pressing and retaining the upper cap 20 at a pressure such that the upper cap 20 is not pushed upper by the volumetric expansion of the compound 10, the temperature adjustable pressing plate 22 and the fixed plate 16 which clamp the molding box 18 at upper and lower sides are heated. When the temperature of the molding box 18 increases to 94–110° C., the heating condition is maintained for at least 15 minutes or more, so that the compound 10 dissolves sufficiently and has fluidity.

(4) Thereafter, the temperature of the pressure plate 22 and the fixed plate 16 is decreased to 55–60° C. When the temperature of the compound 10 of sol-condition in the molding box 18 is decreased to 55–60° C., the pressure on the pressing plate 22 is increased to 100 Kg/cm$^2$ and is maintained for about 30 seconds or more. Thereafter, the temperature of the pressing plate 22 and the fixed plate 16 is decreased slowly to 30° C. or lower, so that the compound 10 assumes a gel-condition and a moulding having the shape of the master model is formed.

(5) The pressure is released from the pressing plate 22, the upper cap 20 is removed from the molding box 18, and solidified moulding integral to the master model 12 is removed from the molding box 18. Thereafter, the master model 12 is separated from the solidified moulding.

(6) The moulding is put into a publicly known vacuum sintering furnace and is heated to 280° C. The rate of the temperature rise is 1–2° C. /min. The temperature of 280° C. is maintained for about 1 hour, and further increased to 1250° C. at the heating speed of 6–7.5° C. /min. The temperature is maintained for at least 1 hour and, thereafter, is lowered rapidly to room temperature. The sintered product thus formed is formed as a metallic mould by applying a finishing process.

EXAMPLE 2

Metal powder of tungsten carbide (WC) of the super hard metal is utilized to form a metallic mould.

(1) Firstly, a powder compound having the following composition (weight %) is prepared.

WC powder (mean grain size 0.5–0.7$\mu$) 80.78% cobalt powder 8.98% agar powder (gel strength 2000 g/cm²) 2.56% stearic acid 0.31% water 7.37%

The agar powder, water, and half the required amount of the metal powder are put into a kneader; it is heated at about between 94–110° C. and shaken so as to dissolve completely the agar powder to form a sol including the metal powder. Next, the temperature of the sol is lowered to about 60° C. and, the remaining metal powder and the entire amount of the stearic acid are added in graduated fashion. The compressing cap of the kneader is positioned, and the sol is sufficiently pressed and kneaded so as to homogenize; thereafter, it is cooled to about 30–35° C. to form a metal block. The metal block is crushed by means of a crushing machine or the like to form a compound in a powder state.

(2) Next, the master model 12 which has been accurately formed beforehand by utilizing the technique and the material similar to that shown in the step (2) in Example 1 is, similar to the Example 1 shown in FIG. 1, located in the moulding box 18 formed of metal and located on a temperature adjustable stationary plate 16 of the metallic mould forming device 14, the compound 10 being formed by above step (1) is filled in a master model 12 located in the moulding box 18, then, the upper cap 20 constituting a part of the mould forming apparatus 14 is located above the compound 10, and similarly to the description relating to the step (2) of Example 1, a pressure of about 50 Kg/cm² is applied as shown in FIG. 2.

(3) By maintaining this pressure, or retaining the pressure of the upper cap 20 at a pressure such that the upper cap 20 is not moved upward by volumetric expansion of the compound 10 being heated, the temperature adjustable pressure plate 22 and the fixed plate 16 which clamp the moulding box 18 from the upper and the lower sides. When the temperature of the moulding box 18 elevates to about 94–110° C., the temperature is maintained for at least 15 minutes so that the compound 10 dissolves sufficiently and has fluidity.

(4) Thereafter, the temperature of the temperature adjustable pressure plate 22 and the fixed plate 16 is lowered to about 55–60° C. When the temperature of the compound 10 of sol-condition in the moulding box 10 is lowered to about 55–60° C., the pressure of the pressure plate 22 is elevated to 100 Kg/cm² and is maintained for at least 30 seconds. Thereafter, the temperature of the pressure plate 22 and the fixed plate 16 is lowered slowly below 30° C. so that the compound 10 assumes a gel condition, and a moulding having the shape of the master model is formed.

(5) The pressure is released from the pressure plate 22, and the moulding box 18 is released from the fixed plate 16. The solidified moulding integrally formed with the master model is released from the moulding box 18 and, thereafter, the master model 12 is released from the moulding.

(6) The moulding thus formed is heated to 280° C. in a vacuum sintering furnace publicly known per se. The rate of the temperature rise is controlled to 1–2° C. /minute, said temperature being maintained for about 1 hour at 280° C., and thereafter, heated to 1380° C. at the heating rate of 6–7.5° C. /minute; this temperature is maintained for at least 1 hour. Then the temperature is quickly lowered to ambient temperature. The finishing process is applied on the sintered product thus formed and assembling process is applied on the product to form a metal mould.

EXAMPLE 3

Tungsten carbide (WC) of the super hard metal is utilized to form a porous metallic mould.

(1) Firstly, a powder compound having the following composition (weight %) is prepared.

WC powder (mean grain size 0.5–0.7μ) 72.36% cobalt powder 15.78% water absorbing powder agar (for forming porous state) 1.80% gar powder (gel strength 2000 g/cm²) 2.51% stearic acid 0.30% water 7.25%

According to the Example, it is possible to control the size the openings formed in the porous sintered metallic mould by selecting the grain size of the water absorbing powdered agar. The agar powder, water, and half the required amount of the metal powder are put into a kneader and heated to about 94–110° C. and agitated so as to dissolve completely the agar powder. A sol including the metal powder is formed. Next, the temperature of the sol is lowered to about 60° C. and, the remaining metal powder and the entire amount of the stearic acid are added in graduated amounts. The compressing cap of the kneader is positioned, and the sol is sufficiently pressed and kneaded to homogenize and, thereafter, the water absorbing powder agar (for forming porous state) is added and are kneaded further. The mixture is cooled to about 30–35° C. to form a metal block; thereafter the metal block is crushed by a crushing machine and the like to form a compound in a powder state.

(2) Then, the master model 12 being accurately formed beforehand by utilizing the technique and the material similar to that shown in the step (2) in the Example 1 is, similar to the Example 1 shown in FIG. 1, located in the moulding box 18 being formed of metal and located on a temperature adjustable stationary plate 16 of the metallic mould forming device 14, the compound 10 being formed by above step (1) is filled in a master model 12 located in the moulding box 18, then, the upper cap 20 constituting a part of the mould forming apparatus 14 is located above the compound 10, and similarly to the description relating to the step (2) of Example 1, a pressure of about 50 Kg/cm² is applied as shown in FIG. 2.

(3) By maintaining this pressure, or retaining the pressure of the upper cap 20 at a pressure such that the upper cap 20 is not moved upward by the volumetric expansion of the compound being heated, the temperature adjustable pressure plate 22 and the fixed plate 16 which clamp the moulding box 18 from the upper and the lower sides are heated. When the temperature of the moulding box 18 increases to about between 94–110° C., the heating condition is maintained at least 15 minutes so that the compound 10 dissolves sufficiently and has desired fluidity.

(4) Thereafter, the temperature of the temperature adjustable pressure plate 22 and the fixed plate 16 is lowered to about between 55–60° C. When the temperature of the compound 10 of sol-condition in the moulding box 10 is lowered to about between 55–60° C., the pressure of the pressure plate 22 is elevated to 100 Kg/cm² and is maintained for at least 30 seconds. Thereafter, the temperature of the pressure plate 22 and the fixed plate 16 is lowered slowly to one lower than 30° C. so that the compound 10 assumes a gel condition, and a moulding having the shape of the master model is formed.

(5) The pressure is released from the pressure plate 22, and the moulding box 18 is released from the fixed plate 16.

The solidified moulding integrally formed with the master model is released from the moulding box 18 and, thereafter, the master model 12 is released from the moulding.

(6) The moulding thus formed is heated to 280° C. in a vacuum sintering furnace publicly known per se. The rate of the temperature rise is controlled to 1–1.5° C. /minute. The temperature is maintained for about 3 hours at 280° C. so that the powder agar for binding and the powdered agar for forming the porous condition is fully decomposed thermally; thereafter, it is heated to 1380° C. at the heating rate of 6–7.5° C. /minute, and the temperature is maintained for at least 1 hour. Then, the temperature is quickly lowered to ambient temperature. The finishing process is applied on the sintered product thus formed and, an assembling process is applied on the product to form a metal mould.

ADVANTAGES OF THE INVENTION

According to the present invention, a compound formed of an agar binder is utilized as a transcribing material for the inversion model and for substituting the pouring type compound material of metal and resin. Further it utilizes a compound formed of a agar binder, and by sintering the inversion model a sintered metallic mould is formed, utilizing the compound formed by the agar binder as a transcribing material for the inversion model. By utilizing the compound formed of the agar binder as the transcribing material for the inversion model, the following results are obtained.

(1) It is possible to heat and form at a low pressure, thus the master model is not damaged.

(2) A complicated form of the master model can be faithfully duplicated since fluidity is superior.

(3) The binder removing step is not required, thus, it is possible to directly sinter the formed model in the sintering furnace, thereby reducing the time for making a sintered metal mould.

(4) The characteristics of the sintered metal mould are nearly equal to that of a steel metal mould.

(5) It is required to prepare instruments for use in a heating and forming step, and to perform a sintering step.

Accordingly, it is not substantially required to perform the cutting operation on a metal block and, only a finishing machining is required. Therefore, it is possible to form in a very short time a metal mould for the trial production having virtually the same quality as a steel one being utilized in a metal mould for mass production.

Although it is required to prepare new jigs and to perform a sintering step, it is possible to solve the problems in the prior art mould for trial production by utilizing a pouring type complex material of metal and resin and a prior art metal mould made of an easily machineable metal.

Further, the sintered metal mould according to the invention can be utilized as the mould for production after effecting some slight alterations.

Further, according to the invention, it is possible to utilize various metals namely the family alloy of stainless steel, tool steel, super hard metal, and ceramic. The moulding formed of metal powder according to the invention can easily be formed by a process similar to the prior art pouring type complex material of metal and resin for making inverted model. A mould for trial production having high dimensional accuracy can easily be formed by sintering the moulding. When a sintering furnace is provided in a factory for making the moulding, it is possible to produce a sintered metal mould within one or two days. Further, when the dimensional correction on the sintered metal mould or the correction cutting is relatively small, it is possible to make a large metal mould for mass production within two or three days. Thus, it is possible to substantially reduce the cost and delivery time. Further, upon checking the product and finding no problems, the mould for trial production can be used for mass production, thereby possibly further reducing cost and saving time.

Further, when a compound including the water absorptive agar powder is utilized as the material for making an inverted model, the water absorptive agar is thermally decomposed during the sintering step, and the site of the water absorptive powdered agar make pores. The air holes are distributed evenly in the sintered product which act to receive air enclosed in the mould in making of the mould and to receive gas generated by the resin in the mould forming material, therefore, it is not required to provide vacuum vent or air vent. Further, the size of the air holes in the moulding can be selected according to the grain size of the agar powder.

What is claimed is:

1. A sintered mold for use in a molding operation, the mold having been made by a non-injection molding process comprising: mixing metal or ceramic powder and agar powder having a gel strength of 2,000 g/cm$^2$ under conditions suitable to produce a sol, forming the sol into a solid block, crushing the solid block to form a compound powder, placing a shaped master model and the compound powder into a molding box, compressing and heating the compound powder to form a fluid, cooling the fluid to form a molded body having a shape complementary to that of the master model, releasing the molded body from the molding box and master model, and sintering the molded body to form the mold.

2. The mold of claim 1 wherein the average diameter of the metal or ceramic powder is 0.5 to 15 µm.

3. The mold of claim 1, wherein the metal or ceramic powder comprises tungsten carbide powder.

4. A non-injection molding method for forming a sintered mold for use in a molding operation, which comprises: mixing metal or ceramic powder and agar powder having a gel strength of 2,000 g/cm$^2$ under conditions suitable to form a sol, forming the sol into a solid block, crushing the solid block to form a compound powder, placing a shaped master model and compound powder into a molding box, compressing and heating the compound powder to form a fluid, cooling the fluid to form a molded body having a shape complementary to that of the master model, releasing the molded body from the molding box and master model, and sintering the molded body to form the mold.

5. A method of claim 4 wherein the metal or ceramic powder has an average diameter of 0.5 to 15 µm.

6. A method of claim 4 wherein the metal or ceramic powder comprises tungsten carbide powder.

7. A method of claim 4 wherein forming the solid block from the sol comprises: cooling the sol, mixing in further metal or ceramic powder to obtain a mixture, and cooling the mixture to form the solid block.

8. A method of claim 4 further comprising mixing stearic acid into the mixture.

9. A porous sintered mold for use in a molding operation, which mold is formed by a non-injection molding process comprising: mixing metal or ceramic powder and agar powder having a gel strength of 2,000 g/cm$^2$ under conditions suitable to obtain a sol, cooling the sol, mixing in water-absorbing agar having a gel strength of 2,000 g/cm$^2$ to obtain a mixture, cooling the mixture to form a solid block, crushing the solid block to form a compound powder, placing a shaped master model and the compound powder into a molding box, compressing and heating the compound powder to form a fluid, cooling the fluid to form a molded body having a shape complementary to that of the master model, releasing the molded body from the molding box and master model, and sintering the molded body to form the porous mold.

10. The metal mold of claim 9 wherein the average diameter of the metal or ceramic powder is 0.5 to 15 µm.

11. The metal mold of claim 9 wherein the metal or ceramic powder comprises tungsten carbide powder.

12. A non-injection molding method for forming a porous sintered mold for use in a molding operation, comprising mixing metal or ceramic powder and agar powder having gel strength of 2,000 g/cm$^2$ under conditions suitable to obtain a sol, cooling the sol, adding water-absorbing agar powder having a gel strength of 2,000 g/cm$^2$ to form a mixture, cooling the mixture to form a solid block, crushing the block to form a compound powder, placing a master model and the compound powder into a molding box, compressing and heating the compound powder to form a fluid, cooling the fluid to form a molded body having a shape complementary to that of the master model, releasing the molded body from the molding box and master model, and sintering the molded body to form the porous mold.

13. A method of claim 12 wherein the metal or ceramic powder has an average diameter of 0.5 to 15 µm.

14. A method of claim 12 wherein the metal or ceramic powder comprises tungsten carbide powder.

15. A method of claim 12 further comprising mixing a second portion of metal or ceramic powder into the mixture.

16. A method of claim 12 further comprising mixing stearic acid into the mixture.

* * * * *